(12) United States Patent
Komiya et al.

(10) Patent No.: US 7,781,508 B2
(45) Date of Patent: *Aug. 24, 2010

(54) RUBBER COMPOSITION

(75) Inventors: Eiji Komiya, Fujisawa (JP); Shiro Hirose, Fujisawa (JP)

(73) Assignee: NOK Corporation, Tokyo (JP)

( * ) Notice: Subject to any disclaimer, the term of this patent is extended or adjusted under 35 U.S.C. 154(b) by 73 days.

This patent is subject to a terminal disclaimer.

(21) Appl. No.: 11/921,911

(22) PCT Filed: Jun. 6, 2006

(86) PCT No.: PCT/JP2006/311294

§ 371 (c)(1),
(2), (4) Date: Dec. 10, 2007

(87) PCT Pub. No.: WO2006/132225

PCT Pub. Date: Dec. 14, 2006

(65) Prior Publication Data

US 2009/0121176 A1    May 14, 2009

(30) Foreign Application Priority Data

Jun. 10, 2005  (JP) .............................. 2005-170284

(51) Int. Cl.
*C08K 3/08* (2006.01)
*C08K 5/14* (2006.01)
*C08K 5/17* (2006.01)

(52) U.S. Cl. ...................... 524/435; 524/515; 524/562; 524/560; 525/379; 525/387; 428/692.1

(58) Field of Classification Search ................ 524/435, 524/515, 556, 562; 525/379, 387; 428/692.1
See application file for complete search history.

(56) References Cited

U.S. PATENT DOCUMENTS

| | | | | |
|---|---|---|---|---|
| 4,933,389 A | * | 6/1990 | Hikasa et al. ............... | 524/523 |
| 5,990,218 A | * | 11/1999 | Hill et al. ................... | 524/431 |
| 6,183,551 B1 | * | 2/2001 | Okamoto et al. ......... | 106/287.12 |
| 6,870,002 B2 | * | 3/2005 | Abe et al. ................... | 524/856 |
| 7,157,515 B2 | * | 1/2007 | Abe et al. ................... | 524/435 |
| 7,435,778 B2 | * | 10/2008 | Hirose ........................ | 524/517 |
| 7,468,411 B2 | * | 12/2008 | Smith et al. ................ | 524/219 |
| 2005/0275565 A1 | * | 12/2005 | Nachtigal et al. .......... | 341/16 |

FOREIGN PATENT DOCUMENTS

| | | | |
|---|---|---|---|
| JP | 06093147 A | * | 4/1994 |
| JP | 11-246749 | | 9/1999 |
| JP | 2000-143894 | | 5/2000 |
| JP | 2002-146136 | | 5/2002 |
| JP | 2001-200117 | | 7/2002 |
| JP | 2003-025354 | | 1/2003 |
| JP | 2003-183443 | | 7/2003 |
| JP | 2004-026849 | | 1/2004 |
| JP | 2005-042124 | | 2/2005 |
| WO | WO 03051983 A1 | * | 6/2003 |
| WO | WO 2004/029155 | | 4/2004 |
| WO | WO 2006006346 A1 | * | 1/2006 |

OTHER PUBLICATIONS

JP 06093147 A, Apr. 1994, Derwent Abstract.*

* cited by examiner

*Primary Examiner*—Satya B Sastri
(74) *Attorney, Agent, or Firm*—Brinks Hofer Gilson & Lione

(57) ABSTRACT

A rubber composition, which comprises 100 parts by weight of an ethylene-alkyl acrylate copolymer rubber, 5-40 parts by weight of EPDM, 1-40 parts by weight of an $\alpha$-olefin oligomer, 0.5-4 parts by weight of an organic peroxide crosslinking agent, 0.5-4 parts by weight of an amine-based vulcanizing agent, and 300-1,000 parts by weight of magnetic powder. The rubber composition is a rubber composition filled a magnetic powder at a high packing density, where an ethylene-alkyl acrylate copolymer rubber having amine vulcanizable groups as a binder, and effectively usable in rubber-bonded sensor magnets, etc., without any foaming at the time of vulcanization molding and with distinguished processabilities such as mold releasability, etc.

9 Claims, No Drawings

RUBBER COMPOSITION

RELATED APPLICATION

This application is a 35 U.S.C. §371 national stage filing of International Patent Application No. PCT/JP2006/311294, filed Jun. 6, 2006, to which priority is claimed under 35 U.S.C. §120 and through which and to which priority is claimed to Japanese Priority Patent Application No. 2005-170284, filed Jun. 10, 2005.

TECHNICAL FIELD

The present invention relates to a rubber composition, and more particularly to a rubber composition for use as a molding material, etc. for rubber bonded sensor magnets.

BACKGROUND ART

Rubber-bonded sensor magnets are used in magnetic encoder for use at positions of encoders such as speed sensors, etc. Generally, NBR has been so far used as a binder for rubber-bonded magnets of wheel speed sensor, but in the case of application to the position of engine-driving system and its surrounding positions, the service atmosphere is at high temperatures such as about 130° to about 170° C., and consequently NBR, whose upper limit heat-resistant temperature is about 120° C., cannot be used at such positions.

Rubber applicable even to such high temperatures as about 130° to about 170° C. includes, for example, silicone rubber, fluoro rubber, acrylic rubber, etc., but the silicone rubber has an oil resistance problem, whereas in the case of the fluoro rubber the rubber flexibility will be considerably lost when magnetic powder is filled in the fluoro rubber at a high packing density, and the mixing proportion of magnetic powder is limited, so a high magnetic force is hard to obtain. The acrylic rubber has a considerably low rubber strength when the magnetic powder is filled at a high packing density, and thus fails to serve as a binder.

The present applicant have so far proposed a rubber composition for magnetic encoders, which comprises an ethylene-methyl acrylate copolymer rubber, magnetic powder, and an amine-based vulcanizing agent. Magnetic encoders vulcanization-molded from such a rubber composition has not only distinguished heat resistance, water resistance, and saline water resistance, but also has a distinguished magnetic force, because of the magnetic powder being filled in the rubber component at a high packing density. However, the rubber composition still has processability problems, such as occurrence of foaming in case of peroxide cross-linking agent at the time of vulcanization molding and a poor mold releasability in case of amine-based vulcanizing agent.

Patent Literature 1: JP-A-2004-26849

DISCLOSURE OF THE INVENTION

Problem to be Solved by the Invention

An object of the present invention is to provide a rubber composition filled a magnetic powder at a high packing density, where an ethylene-alkyl acrylate copolymer rubber having amine vulcanizable groups as a binder, and effectively usable in rubber-bonded sensor magnets, etc., without any foaming at the time of vulcanization molding and with distinguished processabilities such as mold releasability, etc.

Means for Solving the Problem

The object of the present invention can be attained by a rubber composition, which comprises 100 parts by weight of an ethylene-alkyl acrylate copolymer rubber, 5-40 parts by weight of EPDM, 1-40 parts by weight of an α-olefin oligomer, 0.5-4 parts by weight of an organic peroxide cross-linking agent, 0.5-4 parts by weight of an amine-based vulcanizing agent, and 300-1,000 parts by weight of magnetic powder.

EFFECT OF THE INVENTION

The present rubber composition can improve a stickiness to a mold, which has been so far a defect of ethylene-alkyl acrylate copolymer rubber having amine-vulcanizable groups, by addition of α-olefin oligomer, and also can improve vulcanization characteristics remarkably by simultaneous use of EPDM and also by addition of an organic peroxide, thereby solving the problems of foaming and stickiness to a mold due to high packing density and short vulcanization. Simultaneous use of EPDM can prevent bleeding out of α-olefin oligomer and also can attain a synergistic effect on three points, i.e. improvements of roll kneadability and unstickiness to a mold, and suppression of foaming. Furthermore, the resulting vulcanizates have satisfactory properties for rubber-bonded sensor magnets.

BEST MODES FOR CARRYING OUT THE INVENTION

Ethylene-alkyl acrylate copolymer rubber typically ethylene-methyl acrylate copolymer rubber and ethylene-ethyl acrylate copolymer rubber, can be classified into two major types, i.e. amine-vulcanizable type and peroxide-cross-linkable type. The peroxide-cross-linkable type has a possibility of foaming caused by retaining of unreacted peroxide decomposition gases in the vulcanized rubber, which are generated at the time of cross-linking, because the magnetic powder must be filled at a high packing density, and thus to fill about 500 parts by weight, or more of the magnetic powder per 100 parts by weight of the copolymer rubber, it is desirable to use an amine-vulcanizable type.

Ethylene-alkyl acrylate copolymer rubber having amine-vulcanizable groups (ternary AEM) for use herein includes ethylene-alkyl acrylate copolymer rubbers, copolymerized with epoxy group or hydroxyl group containing monomers, etc. For example, commercially available products (Vamac series of duPont products, etc.) can be used as such. The epoxy-containing vinyl monomer for use herein includes, for example, glycidyl (meth)acrylate, allyl glycidyl ether, glycidyl vinyl ether, alicyclic epoxy-containing (meth)acrylates, etc. The hydroxyl-containing vinyl monomer for use herein includes, for example, 2-hydroxyethyl (meth)acrylate, 2-hydroxypropyl (meth)acrylate, 3-hydroxypropyl (meth)acrylate, 4-hydroxybutyl (meth)acrylate, etc. The vinyl monomer can be used generally in a proportion of about 0.1 to about 10% by weight on the basis of the ethylene-alkylacrylate copolymer rubber, as a cross-linking point formable monomer. Binary ethylene-alkyl acrylate copolymer rubber cannot undergo amine vulcanization and thus is not suitable for use in the present invention.

EPDM is used in a proportion of 5-40 parts by weight, preferably 5-20 parts by weight per 100 parts by weight of ethylene-alkyl acrylate copolymer rubber, preferably ternary AEM. Addition of EPDM can ameliorate vulcanization characteristics, and can highly improve the processability when admixed with α-olefin oligomer as a plasticizer, and also can improve the non-foamed state. In a proportion below 5 parts by weight the α-olefin oligomer plasticizer will bleed out on the surface of rubber composition, deteriorating the roll kneadability, whereas in a proportion of above 40 parts by weight, the vulcanization rate will be lowered, resulting in lowered productivity.

The α-olefin oligomer for use herein is an oligomer of α-olefin having 6-14 carbon atoms, including, for example, hexene-1, heptene-1, octene-1, nonene-1, decene-1, dodecene-1, tetradecene-1, etc. and a number average molecular weight of about 400 to about 2,000, preferably in a liquid state oligomer at the ordinary temperature from the viewpoint of handling. Practically, commercially available products such as Duracin 170 of BP Co., Daialen 10 of Mitsubishi Chemical Corp. product, etc. can be used as such. The α-olefin oligomer can be used in a proportion of 1-40 parts by weight, preferably 1-20 parts by weight, per 100 parts by weight of ternary AEM. Addition of α-olefin oligomer in a proportion within the above-mentioned range can improve the unstickiness to a mold, but in a proportion above 40 parts by weight the addition will deteriorate the roll kneadability.

Both of a peroxide-based cross-linking agent and a amine-based vulcanizing agent are used as a vulcanization system. Specifically, 0.5-4 parts by weight, preferably 0.5-2 parts by weight, of an organic peroxide cross-linking agent, and 0.5-4 parts by weight, preferably 0.5-2 parts by weight, of an amine-based vulcanizing agent, are used per 100 parts by weight of ternary AEM. When only the amine-based vulcanizing agent is used, foaming will be liable to occur, increasing the stickiness to a mold considerable, whereas, when only the peroxide-based cross-linking agent is used, foaming will be liable to occur in the case of a ternary AEM single polymer, and the foaming can be considerably suppressed in the case of a plasticizer-admixed ternary AEM/EPDM blend polymer, but the strength will be lower than in the case of the binary vulcanization system. When the vulcanizing agent are used in proportions above defined amounts foaming will also occur.

The organic peroxide for use as a peroxide-based cross-linking agent includes, for example, t-butyl peroxide, dicumyl peroxide, 2,5-dimethyl-2,5-di(t-butylperoxy)hexane, 2,5-dimethyl-2,5-di(t-butylperoxy)-hexine-3,1,1-di(t-butylperoxy)-3,3,5-trimethylcyclohexane, etc. Preferably, 2,5-dimethyl-2,5-di(t-butylperoxy)hexane, and 1,1-di(t-butylperoxy)-3,3,5-trimethylcyclohexane can be used.

The amine-based vulcanizing agent for use herein includes, for example, aliphatic polyamine compounds such as hexamethylenediamine, hexamethylenediamine carbamate, hexamethylenediamine-cinnamaldehyde adduct, hexamethylenediamine benzoate, diamino-modified siloxane, etc.; alicyclic polyamine compounds such as 4,4'-methylenebiscyclohexylamine, bis(4-amino-3-methyldicyclohexyl)methane, 4,4'-methylenebiscyclohexylamine-cinnamaldehyde adduct, etc.; and aromatic polyamine compounds such as m-phenylenediamine, 4,4'-diaminodiphenyl ether, p-phenylenediamine, p,p'-ethylenedianiline, 4,4'-(p-phenylenediisopropylidene)dianiline, 4,4'-(m-phenylenediisopropyldene)dianiline, 3,4'-diaminodiphenyl ether, 4,4'-diaminodiphenyl sulfone, 2,2-bis[4-(4-aminophenoxy)phenyl]propane, bis[4-(4-aminophenoxy)phenyl]sulfone, bis[4-(3-aminophenoxy)phenyl]sulfone, 4,4'-bis(4-aminophenoxy)biphenyl, bis[4-(4-aminophenoxy)phenyl] ether, 2,2-bis[4-(4-aminophenoxy)phenyl] hexafluoropropane, 1,4-bis(4-aminophenoxy)benzene, 1,3-bis(4-aminophenoxy)benzene, etc.

When the organic peroxide is used as a cross-linking agent, it is preferable to use a co-cross-linking agent comprising polyfunctional unsaturated compounds. Polyfunctional unsaturated compounds include, for example, ethyleneglycol di(meth)acrylate, propyleneglycol di(meth)acrylate, triallyl (iso)cyanurate, trimethylolpropane tri(meth)acrylate, triallyl trimellitate, etc. The co-cross-linking agent is used in a proportion of about 0.1 to about 10 parts by weight, preferably about 0.5 to about 5 parts by weight, per 100 parts by weight of ternary AEM. In a proportion below about 0.1 parts by weight neither satisfactory vulcanization rate nor satisfactory physical properties of vulcanizate can be obtained any more, whereas in a proportion above about 10 parts by weight the elongation property will be considerably lowered.

Magnetic powder for use herein generally includes ferrite magnet powder and rare earth magnet powder having particle sizes of about 0.5 to about 10 μm. From the viewpoint of cost or tight adhesion to rubber, the ferrite magnet powder is preferably used though it has a lower magnetic force than that of the rare earth magnet powder. Among various kinds of available ferrite magnet powder, strontium ferrite powder or barium ferrite powder is preferably used from the viewpoint of magnetic force. It is preferable to use such magnet powder having a Br value of 1,600 G or more and an iHc value of 2,000 Oe or more, obtained by determination of the magnetism of the test pieces of pressure molded powder. Test pieces are prepared from the magnetic powder in such a manner that, for example, 20 g of magnetic powder is admixed with 1.5 ml of an aqueous 5 wt. % polyvinyl alcohol solution, and the resulting mixture is placed into a cylindrical mold, 25.4 mm in diameter, followed by pressure molding at 1 ton/cm$^2$ (98 MPa). The test pieces are then subjected to determination of residual flux density Br and coercive force iHc by a direct current magnetization tester.

Such magnetic powder is used in a blending proportion of about 300 to about 1,000 parts by weight, preferably about 400 to about 900 parts by weight, per 100 parts by weight of copolymer rubber. In a blending proportion below about 300 parts by weight, the necessary magnetic force for the encoder will not be obtained, whereas in a proportion above about 1,000 parts by weight the flexibility of vulcanization molding products will be deteriorated.

The rubber composition comprising the foregoing respective components can further contain a reinforcing agent typically carbon black, an antioxidant, a plasticizer, a processing aid, a vulcanization aid, etc., if required. These components are kneaded through a tightly closed kneader, open rolls, etc., and the kneaded product is molded by pressure molding such as injection molding, compression molding, transfer molding, etc. at about 150° to about 200° C. for about 0.5 to about 60 minutes.

Molding is carried out in the form of vulcanization bonding to a metallic plate such as a stainless steel plate, a cold-rolled steel plate, etc. serving as an encoder support ring, and thus it is preferable that a commercially available adhesive of phenol resin series, epoxy resin series, silane series, etc. is applied to the bonding surface of such a metallic plate in advance to the vulcanization bonding.

EXAMPLES

The present invention will be described below, referring to Examples.

Example 1

| | Parts by weight |
|---|---|
| Ethylene-alkyl acrylic copolymer rubber having amine-vulcanizable groups (VAMC GLS, a duPont product) | 100 |
| EPDM (Espren 586, a Sumitomo Chemical product) | 20 |
| Strontium ferrite (FA-700, a Toda Kogyo product) | 800 |
| Stearic acid | 2 |
| 4,4'-($\alpha,\alpha$-dimethylbenzyl) diphenylamine (Antioxidant CD, an Ouchi-Shinko Kagaku product) | 2 |
| Ether type phosphoric acid ester-based processing aid (RL210, a Toho Kagaku product) | 2 |
| alpha-olefin oligomer (DURACIN 170, a BP product) | 10 |
| 1,3-bis(t-butylperoxyisopropyl) benzene (Peroxymon F40, a NOF Corp. product; purity 40%) | 6 |
| Hexamethylenediamine carbamate (Cheminox AC-6-66, a Unimatec product) | 2 |
| Di-o-tolylguanidine (Nocceler-DT, an Ouchi-Shinko Kagaku product) | 4 |

The foregoing components were kneaded through a tightly closed kneader (MS type pressure kneader) and open rolls, and the kneading product was compression molded at 180° C. for 8 minutes to make a vulcanized rubber sheet, 2 mm in thickness.

Determination or evaluation of unvulcanized material characteristics of kneaded product and material characteristics of vulcanized rubber sheet was carried out as follows:

Roll kneadability: Good windability around rolls at the time of kneading was evaluated as "○", whereas poor windability (bagging) as "X"

Unstickiness to mold: No observation of stickiness to a mold at the time of vulcanization was evaluated as "○", whereas observation of stickiness as "X"

Foaming state: Observation of no forming on the surface of vulcanized sheet (test piece), 125 mm×230 mm×2 mm was evaluated as "○", whereas observation of foaming all over the surface of the sheet as "X"

MH and $T_{90}$: According to JIS K-6300; determinations at 180° C. by Lotus rheometer RLR-3, made by Toyo Seiki Co.

Normal state physical properties: According to JIS K6253 and 6251, determination of hardness, tensile strength, and elongation Residual flux density (T): Test pieces, 22 mm in diameter and 1 mm in thickness, were molded under a magnetic field of 0.8 mT using a magnetic field-formable injection molding machine, and the test pieces were magnetized to saturation of residual flux density in the thickness direction by a direct current magnetizer. Three magnetized test pieces were stacked one upon another to determine residual flux density by a flux meter connected to a search coil.

Example 2

In Example 1, the amount of EPDM was changed to 3 parts by weight.

Example 3

In Example 1, the amount of $\alpha$-olefin oligomer was changed to 5 parts by weight.

Comparative Example 1

In Example 1, no EPDM was used.

Comparative Example 2

In Example 1, no $\alpha$-olefin oligomer was used.

Comparative Example 3

In Example 1, the amount of $\alpha$-olefin oligomer was changed to 50 parts by weight.

Comparative Example 4

In Example 1, in place of $\alpha$-olefin oligomer, the same amount of a polyether-based plasticizer (RS-700, an Asahi Denko product) was used.

Comparative Example 5

In Example 1, in place of $\alpha$-olefin oligomer, the same amount of a phosphate-based plasticizer (DOS, a Shin-Nippon Rika product) was used.

Results obtained in the foregoing Examples and Comparative Examples are shown in the following Table.

TABLE

| Items of determination and evaluation | Example No. | | | Comp. Ex. No. | | | | |
|---|---|---|---|---|---|---|---|---|
| | 1 | 2 | 3 | 1 | 2 | 3 | 4 | 5 |
| Roll kneadability | ○ | ○ | ○ | X | ○ | X | ○ | ○ |
| Unstickiness to mold | ○ | ○ | ○ | ○ | X | ○ | X | X |
| Foaming state | ○ | ○ | ○ | X | ○ | ○ | ○ | ○ |
| MH (N·m) | 17.9 | 11.6 | 18.8 | 10.4 | 20.5 | 9.5 | 16.4 | 13.3 |
| $T_{90}$ (min.) | 6.1 | 7.2 | 6.2 | 7.8 | 5.7 | 5.7 | 6.2 | 6.4 |
| Normal state physical properties | | | | | | | | |
| Hardness (Duro D) | 88 | 84 | 8.7 | (impossible to mold) | | 73 | 85 | 86 |
| Tensile strength (MPa) | 3.4 | 3.0 | 3.5 | — | — | 1.4 | 2.5 | 2.8 |
| Elongation (%) | 100 | 130 | 180 | — | — | 580 | 110 | 150 |
| Residual flux density (T) | 15.5 | 16.1 | 15.2 | — | — | 14.2 | 15.0 | 15.3 |

It can be seen from the foregoing results:
(1) In all of Examples 1 to 3, the residual flux density is high, respectively, and satisfactory properties for rubber-bonded sensor magnet can be obtained;
(2) Comparison of Examples 1 and 2 with Comparative Example 1 reveals that addition of EPDM can ameliorate the vulcanization characteristics and improve the non-foamed state and without addition of EPDM, the α-olefin oligomer bleeds out onto the surface of rubber composition, thereby deteriorating the roll kneadability;
(3) Comparison of Examples 1 and 3 with Comparative Example 2 reveals that addition of α-olefin oligomer can improve the unstickiness to a mold, but excess addition thereof deteriorates the roll kneadability; and
(4) Comparison of Examples 1 to 3 with Comparative Examples 4 and 5 reveals that only α-olefin oligomer has an unstickiness to a mold.

The invention claimed is:

1. A rubber composition, which comprises 100 parts by weight of an ethylene-alkyl acrylate copolymer rubber, 5-40 part by weight of EPDM, 1-40 parts by weight of an α-olefin oligomer consisting of an oligomer of α-olefin having 6-14 carbon atoms and an average molecular weight Mn of 400-2,000, 0.5-4 parts by weight of an organic peroxide cross-linking agent, 0.5-4 parts by weight of an amine-based vulcanizing agent, and 300-1,000 part by weight of magnetic powder.

2. A rubber composition according to claim 1, wherein the ethylene-alkyl acrylate copolymer rubber is an ethylene-alkyl acrylate copolymer rubber having amine-vulcanizable groups.

3. A rubber composition according to claim 2, wherein the ethylene-alkyl acrylate copolymer rubber having amine-vulcanizable groups is an ethylene-alkyl acrylate copolymer rubber copolymerized epoxy group or hydroxyl group containing monomers.

4. A rubber composition according to claim 1, wherein 0.0-10 parts by weight of a co-cross-linking agent of polyfunctional unsaturated compound is used together with the organic peroxide cross-linking agent.

5. A rubber composition according to claim 1, wherein the magnetic powder is ferrite magnetic powder or rare earth magnetic powder.

6. A rubber composition according to claim 5, wherein the ferrite magnetic powder is strontium ferrite powder or barium ferrite powder.

7. A rubber composition according to claim 1, for use as a molding material for a rubber-bonded sensor magnet.

8. A rubber-bonded sensor magnet vulcanization-molded from a rubber composition according to claim 7.

9. A rubber-bonded sensor magnet according to claim 7, for use as a magnetic encoder.

* * * * *